Patented Nov. 13, 1945

2,388,840

UNITED STATES PATENT OFFICE 2,388,840

GLYCEROL PRODUCTION

Ellis I. Fulmer, Leland A. Underkofler, and Richard J. Hickey, Ames, Iowa, assignors to Iowa State College Research Foundation, Ames, Iowa, a corporation of Iowa No Drawing. Application June 23, 1941,
Serial No. 399,416

7 Claims. (Cl. 195—38)

This invention relates to a process for the production of glycerol. More specifically it embraces a process for the production of glycerol by means of the fermentation of sugars.

Heretofore the principal source of glycerol has been from fats, chiefly from the unsaponifiable residue from soap-making. Although a number of fermentation processes for glycerol production have been discovered, none has been sufficiently economical to compete with soap residue glycerol except in time of war.

When fermentable sugars are acted upon by yeasts, under normal acid conditions, the resultant is primarily ethanol and carbon dioxide, accompanied by the formation of small amounts of glycerol and acetic acid. It is necessary to change the equilibrium of the fermentation in order that substantial yields of glycerol be obtained.

Two general methods have been advanced for glycerol production by fermentation processes. The first of these is the "sulfite fixation" process, in which sufficient of a soluble sulfite is added to the fermentation to cause the fixation of acetaldehyde and the consequent formation of glycerol. Except as noted below, all of these fermentations were carried forward in an alkaline medium unfavorable to the growth of yeasts and the resulting glycerol was difficult to separate from the soluble sulfite or other salts remaining. Both of these difficulties were claimed to be obviated in a sulfite fixation process calling for the addition of sulfur dioxide as an acetaldehyde fixative, but concentrations of sulfur dioxide sufficient for useful conversions to glycerol are toxic to yeasts. The second general method is the "alkaline fermentation" process, in which the fermentation is carried out in a medium made alkaline by the addition of alkali salts or bases. The same difficulty of separating the glycerol from the alkali compounds arises as in the sulfite fixation procedure. The alkaline environment is unfavorable to the development of yeasts and is favorable to the growth of certain kinds of bacteria. In addition, various contaminating by-products are often formed. The separation problem is not present in the process which alkalizes with ammonia, but the claimed yields are insufficient to be commercially attractive.

We have discovered a method of producing glycerol by the fermentation of fermentable sugars in which these difficulties noted above have been obviated and from which satisfactory recoverable yields are obtainable.

It is an advantage of our process that the conversion of the sugar used into useful products, including glycerol, is practically complete and that the recovery of each of them in pure form is a very high proportion of that produced. The fermentation products consist of acetaldehyde and glycerol, which are produced in direct proportion to each other, and ethanol, which is produced in inverse proportion to the first two.

A further advantage of our process is that virtually complete recovery of additions to the fermentation is possible in a form in which they can be reused in the process.

Broadly speaking, our new and improved process comprises the fermentation of fermentable sugars in an acid environment in the presence of slightly soluble sulfites.

The raw material for our process is any fermentable sugar or mixture of such sugars, either in pure form or combined with other substances, as in molasses, syrup, etc. For proper action by the yeasts it is necessary that the sugar be in solution. Concentrations of sugar as high as 25 g./100 ml. may be used, although more rapid fermentations will be obtained if the concentration does not exceed 20 g./100 ml. Weak concentrations unduly dilute the end products and make recovery difficult.

To the sugar solution we add an excess of some slightly soluble sulfite. By "excess," as used herein and in the appended claims, is meant sufficient so that a portion always remains undissolved. If insufficient sulfite is added in the first instance, more may be added at any time during the process. The purpose of the sulfite, as will hereinbelow more fully appear, is to supply a source of bisulfite ion whereby the acetaldehyde formed will be fixed. We have found that if the solubility of the sulfite used is above about 2 parts in 100 parts of cold water, the formation of bisulfite ion will be so great as to be toxic to yeast if the pH of the solution is adjusted to a point favorable to yeast growth. Therefore, as used in this specification and the appended claims, the term "slightly soluble sulfite" means salts having a solubility of less than 2 parts in 100 parts of cold water (including so-called insoluble salts), having the sulfite for a negative radical, and having a positive radical which is substantially non-toxic to yeasts in the concentrations used.

We prefer to use calcium sulfite or magnesium sulfite as a slightly soluble sulfite in our process since they are relatively cheap, easily obtainable, and positive ions are not only non-toxic but actually beneficial to the growth of yeasts.

In the above mixture we introduce sufficient yeast for rapid fermentation. Since the presence of sulfite initially retards the action of yeast, we prefer to use acclimatized yeast, although this is not necessary. In acclimatizing the yeast, we inoculate a medium containing fermentable sugars and suitable yeast nutrients with yeast and, when fermentation has become active, we introduce an excess of the chosen sulfite and incubate, accompanied, preferably, by stepwise decrements in the pH to the approximate pH at which the yeast will be used. After the completion of the fermentation, the sulfite-yeast cake filtered out forms an inoculum of acclimatized yeast.

The concentration of yeast or acclimatized inoculum in the sulfite-sugar solution is not critical, since a variation in concentration simply varies the rate of fermentation. Inoculum recovered at the end of the process may be used indefinitely to inoculate new batches.

Since yeasts respond best at about 30° C., we prefer this temperature for the fermentation, although it will proceed at any temperature at which the yeasts themselves are active. During fermentation, the activity is increased by continuous or intermittent stirring.

As soon as the sugar-sulfite solution has been inoculated, we adjust the pH of the mixture by the addition of acid or acid forming substance which is substantially non-toxic to yeast in the concentrations used. Such acid may be either organic or inorganic. In the interests of easy separation of the end products, it is desirable to use an acid which will not combine with the positive ion of the sulfite used to form a compound soluble in an alkaline solution. As acidifiers, $SO_2$ and $H_2SO_3$ offer additional advantages in that they are cheap, easily removed from the end products, and introduce no new negative ion into the fermentation.

It is desirable to regulate the pH of the fermentation within reasonably close limits to obtain the best results. One purpose of the addition of the acid or acid forming substance, as has been pointed out, is to create a more favorable environment for yeast fermentation. However, the most important reason is to cause the formation of bisulfite ion in the medium in order to fix the acetaldehyde as it is formed. This is necessary to the formation of glycerol. The bisulfite ion is, to some extent, toxic to yeast and it is desirable to regulate its concentration at the highest point consistent with rapid and complete fermentation. Since the bisulfite ion concentration is a function of the pH, control of the latter is a simple and convenient method of regulating the former.

The optimum pH is a function of the sulfite employed and the degree of acclimatization of the yeasts employed, hence it is not possible to give an exact rule for its determination. One skilled in the art can very easily determine the optimum pH by making a test fermentation employing the same constituents as the main process, and varying the pH until the optimum value is found. For example, we have found that a pH in the neighborhood of 4.7 is effective with calcium sulfite, while the limiting pH for magnesium sulfite is about 5.0. The best results are obtained by the use of a pH regulator which automatically and continuously adjusts the pH of the medium by additions of the acidifier.

The fermentation should proceed to completion, which ordinarily takes from 18 to 72 hours, depending on the variables pointed out above. When all of the sugar has been transformed, we remove the precipitate of yeast and excess sulfite by some suitable means, such as filtration or centrifugation. The cake thus obtained is a suitable inoculum for the fermentation of additional batches of sugar. If, however, it is not desired to reuse the yeast, this step may be omitted.

The filtrate, or unfiltered mash, as the case may be, containing the fermentation products and soluble sulfites and bisulfites, is made alkaline by the addition of a slight excess of some alkaline compound. Preferably, although not necessarily, this is the base having the same positive ion as the sulfite used, since this procedure simplifies the process, makes separation and purification of the end products easier, and introduces no new ion into the mixture. When magnesium sulfite is used in the fermentation reaction, magnesium hydroxide may be used to render the solution alkaline. Similarly, when calcium sulfite is used in the fermentation, calcium hydroxide may be used as the alkaline addition compound.

Any suitable method for the isolation and purification of the components of this alkaline mixture may be used. We prefer to remove the ethanol and acetaldehyde by distillation. This also breaks down the acetaldehyde-bisulfite complex and precipitates practically all of the bisulfite as sulfite. Since most of the slightly soluble sulfites are less soluble in hot solution than in cold, it is advantageous to filter out the precipitated sulfite while the solution is still hot. This filtration will also remove the yeast in case it has not already been taken out. The remainder is a solution of glycerol containing small amounts of sulfite which vary with the solubility of the sulfite.

From this solution the glycerol may easily be extracted by vacuum distillation, a selective solvent, or other means. A more economical method, however, is to recycle this glycerol solution by adding to it sugar, inoculum, sulfite, etc. for a repetition of the above described process. We have found that the same solution may be recycled in this way several times without appreciable decrease in the rate of fermentation, and with an appropriate increase in the glycerol concentration for each run. When a high concentration is reached, the glycerol may be recovered by means suggested above or some other suitable procedure.

The following specific examples will illustrate the various steps of the process of our invention:

*Example 1*

A volume of 1500 ml. of medium was prepared which contained, per liter, 150 g. of dextrose, 3.5 g. of Difco yeast extract, and, as yeast nutrients, 1.5 g. of ammonium chloride, 1.5 g. of $K_3H_3(PO_4)_2$, 0.4 g. of $MgSO_4 \cdot 7H_2O$ and 0.1 g. of calcium chloride. This medium was inoculated with 195 ml. of a 60-hour culture of stock yeast in a similar medium, and incubated at 30° C. for 12 hours. At that time fermentation was active and 420 g. of $MgSO_3 \cdot 6H_2O$ were added. The culture was returned to incubation and the pH maintained at 6.5 by a Cameron pH recorder-controller using 50% acetic acid. In 40 hours fermentation had returned almost to normal and in 96 hours was complete. The cake formed by filtering contained magnesium sulfite and thoroughly acclimatized yeast.

Example 2

A volume of 1500 ml. of a medium of the composition described in Example 1 was inoculated with acclimatized inoculum obtained as in Example 1. This was incubated at 30° C. and the pH regulated to 6.2 by a Cameron pH recorder-controller using acetic acid. In less than 72 hours the fermentation was complete. Analysis showed a yield of 23.15% of glycerol on dextrose, or 45.5% of the amount glycerol theoretically obtainable from that amount of dextrose.

Example 3

A volume of 1550 ml. of a medium of the composition described in Example 1 was inoculated with an acclimatized inoculum consisting of calcium sulfite and yeast. This was incubated at 30° C. and the pH regulated at 5.0 by a Cameron pH recorder-controller using sulfurous acid. In less than 72 hours the fermentation was complete. Analysis showed a yield of 21.5% on dextrose, or 42.2% of the amount of glycerol theoretically obtainable from that amount of dextrose.

Example 4

A 200 ml. portion of the resultant of Example 1 was filtered and freed of acetaldehyde and ethanol by distillation. To this was added dextrose to 15% of the solution. This was inoculated with acclimatized inoculum containing magnesium sulfite and yeast and incubated. The pH was not controlled but was about 6.3 to 6.4 during the most active parts of the fermentation. The fermentation was complete in less than 3 days and analysis showed a concentration of glycerol of 5.05 g. per 100 ml. The glycerol content of the original liquor was 2.69 g. per 100 ml., giving an increase of 2.36 g. per 100 ml. as a result of recycling, thus indicating that recycling may be profitably employed.

We claim:

1. In a process for the production of glycerol, the step of fermenting with yeast a fermentable sugar in an acid medium containing a sulfite having a solubility of less than 2 parts in 100 parts of cold water, the sulfite being present in a quantity in excess of the quantity which dissolves in the medium.

2. In a process for the production of glycerol, the step of fermenting with yeast a fermentable sugar in a medium containing a sulfite having a solubility of less than 2 parts in 100 parts of cold water, the sulfite being present in a quantity in excess of the quantity which dissolves in the medium, in which medium the pH is adjusted and maintained at less than 7.0 through the addition of a substance selected from the group consisting of sulfur dioxide and sulfurous acid.

3. In a process for the production of glycerol, the step of fermenting with yeast a fermentable sugar in an acid medium containing calcium sulfite in a quantity in excess of the quantity which dissolves in the medium.

4. In a process for the production of glycerol, the step of fermenting with yeast a fermentable sugar in a medium containing calcium sulfite in a quantity in excess of the quantity which dissolves in the medium, in which medium the pH is adjusted and maintained at less than 7.0 through the addition of a substance selected from the group consisting of sulfur dioxide and sulfurous acid.

5. In a process for the production of glycerol, the step of fermenting with yeast a fermentable sugar in an acid medium containing magnesium sulfite in a quantity in excess of the quantity which dissolves in the medium.

6. In a process for the production of glycerol, the step of fermenting with yeast a fermentable sugar in a medium containing magnesium sulfite in a quantity in excess of the quantity which dissolves in the medium, in which medium the pH is adjusted and maintained at less than 7.0 through the addition of a substance selected from the group consisting of sulfur dioxide and sulfurous acid.

7. In a process for the production of glycerol, the step of acclimatizing yeast by subjecting it to a fermentation in an aqueous medium in the presence of magnesium sulfite in a quantity in excess of the quantity which dissolves in the medium.

ELLIS I. FULMER.
LELAND A. UNDERKOFLER.
RICHARD J. HICKEY.